US008266607B2

(12) United States Patent
Burka et al.

(10) Patent No.: US 8,266,607 B2
(45) Date of Patent: Sep. 11, 2012

(54) LOCK RESERVATION USING COOPERATIVE MULTITHREADING AND LIGHTWEIGHT SINGLE READER RESERVED LOCKS

(75) Inventors: Peter W. Burka, Ottawa (CA); Nikola Grcevski, Toronto (CA); Charles B. Hall, Calgary (CA); Zhong L. Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 11/845,364

(22) Filed: Aug. 27, 2007

(65) Prior Publication Data

US 2009/0064094 A1    Mar. 5, 2009

(51) Int. Cl.
*G06F 9/45* (2006.01)
*G06F 9/44* (2006.01)
*G06F 9/46* (2006.01)

(52) U.S. Cl. .................. 717/154; 717/131; 718/107

(58) Field of Classification Search .................. None
See application file for complete search history.

(56) References Cited

U.S. PATENT DOCUMENTS

| | | | | |
|---|---|---|---|---|
| 6,698,015 | B1 * | 2/2004 | Moberg et al. | 717/154 |
| 6,766,513 | B2 * | 7/2004 | Charnell et al. | 717/154 |
| 7,080,376 | B2 | 7/2006 | Buch | |
| 7,209,918 | B2 | 4/2007 | Li | |
| 7,458,065 | B2 * | 11/2008 | Sanchez et al. | 717/131 |
| 7,774,787 | B2 * | 8/2010 | Leino et al. | 718/107 |
| 2005/0289549 | A1 | 12/2005 | Cierniak et al. | |
| 2006/0168585 | A1 | 7/2006 | Grcevski et al. | |
| 2008/0163241 | A1 * | 7/2008 | Aguilar et al. | 718/107 |

OTHER PUBLICATIONS

Alpern et el, The Jalapeno virtual machine, IBM Systems Journal vol. 39, No. 1, 2000, pp. 211-238, Retrieved on [Apr. 27, 2012], Retrieved from the Internet: URL<http:// dl.acm.org/ citation. cfm?id=1011400>.*

Michael, Maged, Scalable Lock-Free Dynamic Memory Allocation, Proceedings of the ACM SIGPLAN 2004 conference on programming language design and implementation, vol. 39, May 2004, pp. 35-46, Retrieved on [Apr. 27, 2012], retrieved from the Internet: URL<http://dl.acm.org/citation.cfm?id=996848>.*

Canadian Patent Application Serial No. 2539908 filed on Mar. 16, 2006.

Tamiya Onodera, et al., Lock Reservation for Java Reconsidered, ECOOP 2004: object-oriented programming (Oslo, Jun. 14-18, 2004), 25 pages. Kenneth Russell, et al., Eliminating Synchronization-Related Atomic Operations with Biased Locking and Bulk Rebiasing, OOPSLA'06, Portland, Oregon, Oct. 22-26, 2006, 9 pages.

Kiyokuni Kawachiya, et al., Lock Reservation: Java Locks Can Mostly Do Without Atomic Operations, Proceedings of ACM OOPSLA 2002, 130-141, 2002, 12 pages.

David F. Bacon, et al., Thin Locks: Featherweight Synchronization for Java, Proceedings of ACM PLDI '98, 258-268, 1998, 11 pages.

Matthew Arnold, et al., Adaptive Optimization in the Jalapeno JVM, OOPSLA'00, Minneapolis, Minnesota, Oct. 15-19, 2000, 19 pages.

* cited by examiner

*Primary Examiner* — Thuy Dao
*Assistant Examiner* — Cheneca Smith
(74) *Attorney, Agent, or Firm* — Cantor Colburn LLP; Libby Toub (57) ABSTRACT

A method for lock reservation using cooperative multithreading is provided. The method includes analyzing code containing async points to support cooperative multithreading. The method also includes identifying a class of code as a candidate for reservation via determining locking properties within the code as a function of locations of async points within the code, and generating reserving code that reserves the shared object when code performing the reservation is considered hot code. The method further includes performing runtime monitoring of reservation performance to detect a contention level for the shared object, and removing the reservation when the runtime monitoring determines that a low level of contention exists. A method for lightweight single reader reserved locks is also provided, including identifying a candidate for reservation containing a read-only locking sequence, conditionally marling the sequence, and generating code using an artificial dependency to control execution order of out-of-line code.

7 Claims, 3 Drawing Sheets

LOCK RESERVATION USING COOPERATIVE MULTITHREADING AND LIGHTWEIGHT SINGLE READER RESERVED LOCKS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer-based locks for synchronization, and particularly to effective lock reservation using cooperative multithreading and lightweight single reader reserved locks.

2. Description of Background

In programs written in programming languages such as Java®, there is often code that is synchronized, but synchronization is not required most of the time. Synchronization allows shared objects to be accessed by multiple objects or threads without corrupting the shared objects or the objects attempting to access the shared objects. Synchronized code typically requires special platform instructions to ensure memory coherency, which are usually expensive in terms of execution time and can significantly slow down a running program. Memory coherency instructions can halt execution of a program while queues or other structures that may be attempting to read or modify shared memory are emptied, preventing unexpected or out-of-order changes related to the shared memory. One compiler technique that has been proposed to solve this issue is lock reservation. With lock reservation, a thread reserves a shared object for itself unless the object is requested by another thread. Once a shared object is reserved, the reserving thread can enter and exit the synchronized region of code without executing the expensive memory coherency instructions.

When a thread wants access to an object that has been reserved for another thread, the reservation has to be cancelled, which is often a very expensive operation in terms of execution time. The reserving thread has to be stopped so that the object reservation can be cancelled. The cancellation operation can be extremely expensive if the threading model is preemptive, where thread execution can be stopped at any place, including the generated code for synchronized enter/exit primitives, e.g. Java® monitor-enter and monitor-exit primitives. Other lock reservation techniques with a smaller cost of cancellation have also been proposed; however, the gain of applying the optimization on modern processors is minimal. Identifying certain types of code patterns involved in code where synchronization is desired could further enhance synchronization performance. Therefore, it would be beneficial to develop methods to optimize synchronization techniques to reduce execution time delays associated with present lock reservation and cancellation algorithms. Accordingly, there is a need in the art for a method for effective lock reservation using cooperative multithreading, and further enhancements using lightweight single reader reserved locks.

SUMMARY OF THE INVENTION

The shortcomings of the prior art are overcome and additional advantages are provided through the provision of a method for lock reservation using cooperative multithreading in a computer system. The method includes analyzing code containing async points to support cooperative multithreading, where the async points provide a checkpoint for a running thread to determine if another thread has requested access to a shared object, with a change in object reservation by a requesting thread occurring at the async points. The method also includes identifying a class of code as a candidate for reservation via determining locking properties within the code as a function of locations of async points within the code, and generating reserving code that reserves the shared object when code performing the reservation is considered hot code that is frequently executed. The method further includes performing runtime monitoring of reservation performance to detect a contention level for the shared object, and removing the reservation when the runtime monitoring determines that a low level of contention exists relative to a threshold value.

Further embodiments include a method for lightweight single reader reserved locks in a computer system. The method includes identifying a class of code as a candidate for reservation containing a read-only locking sequence within the code, where the read-only locking sequence includes a read operation of shared memory without async points. The method also includes marking the read-only locking sequence as not requiring a store or exit barrier when no writes to the shared memory are detected since a previous store or exit barrier prior to the read-only locking sequence, where the store or exit barrier is synchronization code performed by a monitor exit or a volatile store to the shared memory. The method further includes generating code via a compiler using an artificial dependency to control execution order of out-of-line code. The method additionally includes excluding code for the store or exit barrier after the read-only locking sequence, when the read-only locking sequence is marked.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECT

As a result of the summarized invention, technically we have achieved a solution in which execution time delays associated with lock reservation cancellation are significantly reduced over the prior art. Further technical effects include simpler and faster locking code where a lock has been reserved by a thread, applying single reader reserved lock optimizations to read-only reserved locks.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods for effective lock reservation using cooperative multithreading and lightweight single reader reserved locks. Exemplary embodiments provide several enhancements to lock reservation that may practically eliminate the cost of reservation cancellation over prior art methods. Moreover, through applying the inventive principles disclosed herein, additional efficiencies can be achieved by identifying specific scenarios where optimizations such as lightweight single reader reserved locks can further reduce delays associated with execution of synchronized code.

In exemplary embodiments a cooperative threading model is employed, where a thread may only be stopped at well-defined points in the code to achieve synchronization between threads attempting to access a shared object. The running threads voluntarily give up execution of code at so called "async points". These async points are inserted at various places in the code. At the async points, the running thread checks whether another thread requires it to stop and give up execution unit control. Applying this approach, the running thread cannot be stopped while executing monitor-enter and monitor-exit synchronization primitives, and much of the cancellation complication of the prior art is eliminated. Using the cooperative threading model enables improvements to the monitor-enter and monitor-exit generated code for "primitive" synchronized regions, that is, synchronized regions of code that do not contain any async points. This may provide many advantages over prior art systems that had to include complex check logic to handle preemptive calls at any point of execution, including during execution of monitor-enter and monitor-exit synchronization primitives.

Generation of a code sequence for reservation of an object at monitor-enter primitives can be selectively applied, rather than applying the technique to for all locking situations. While some locks may benefit from reservation, reservation on other locks can negatively affect application performance. Therefore, a static heuristic can be selectively applied to identify classes that are candidates for reservation. In exemplary embodiments, the static heuristic candidate identifier is based on locking properties of class code analyzed.

Generating reserving code for every monitor-enter/monitor-exit operation (even for a number of selected classes) might not always be useful, especially given that the cost of cancellation can be high in terms of execution time. Only software methods that are considered "hot", i.e., executed frequently or for long durations, may benefit from lock reservation. A rarely executed synchronized primitive monitor operation, which is transformed to support reservation, is unlikely to show any measurable performance improvement. Therefore, it is preferable to generate code that can reserve an object only when the code is considered "hot".

In exemplary embodiments, a run-time feedback mechanism is employed to undo reservation of a particular class if it is determined that reservation code performs less efficiently on the class than anticipated. Namely, because of high cancellation cost of lock reservation, an inefficient use of reservation on a candidate class can be detrimental for performance. Additionally, lock reservation can cause false contention if a class is incorrectly identified for reservation. False contention can be caused by lock reservation because objects are not unlocked when they are reserved. For example, if a particular data structure (an object) exhibits small levels of contention (relative to a threshold value), then lock reservation may make the contention severe, because the lock will effectively be held longer than usual.

Figure 1:
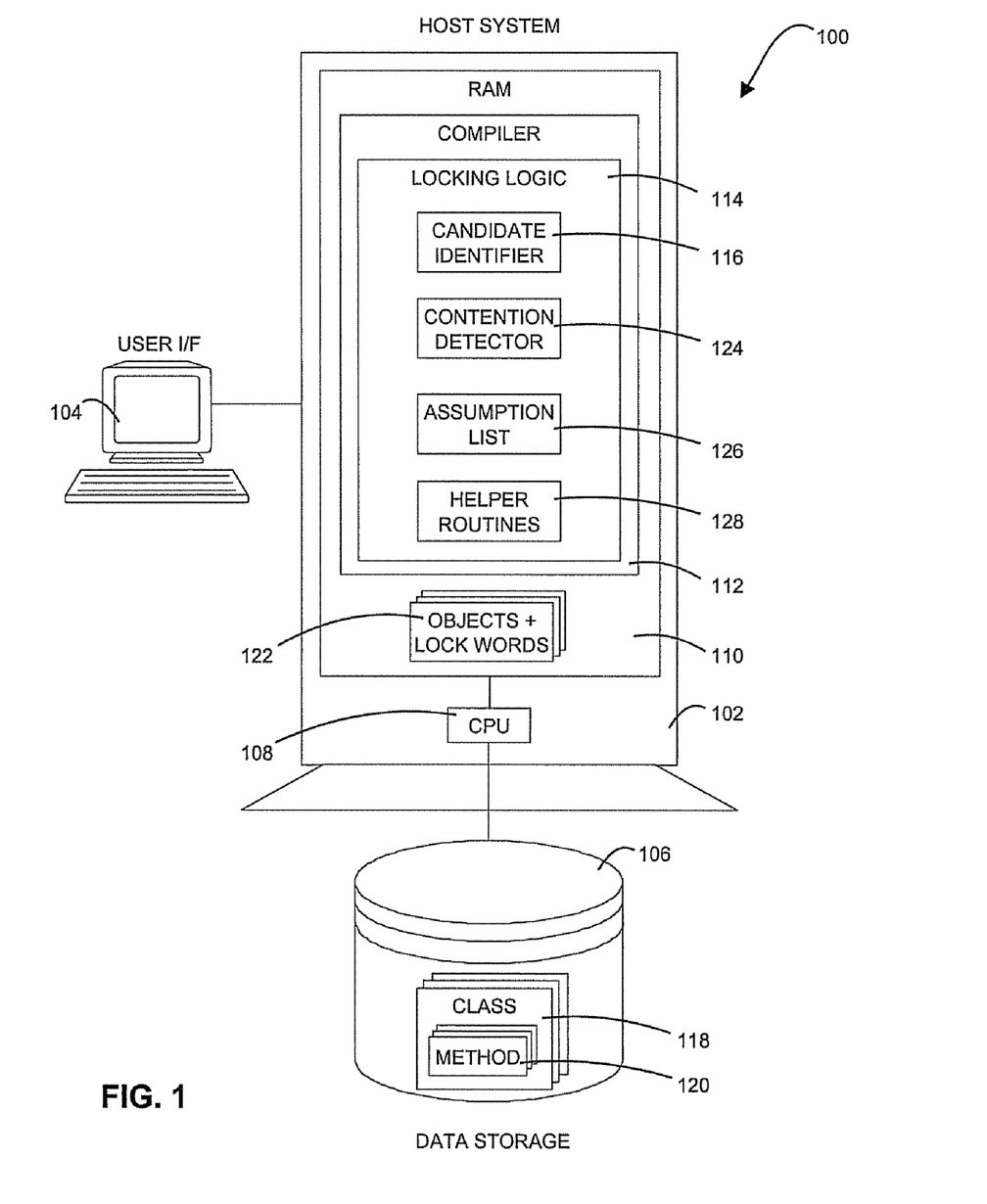
FIG. 1 depicts one example of a system for effective lock reservation using cooperative multithreading and lightweight single reader reserved locks.

Turning now to the drawings, it will be seen that in FIG. 1 there is a block diagram of a system 100 for effective lock reservation using cooperative multithreading and lightweight single reader reserved locks that is implemented in accordance with exemplary embodiments. The system 100 of FIG. 1 includes a host system 102 in communication with a user interface 104 and a data storage device 106. The host system 102 may be any type of computer system known in the art. For example, the host system 102 can be a desktop computer, a laptop computer, a general-purpose computer, a mainframe computer, or an embedded computer (e.g., a computer within a wireless device). In exemplary embodiments, the host system 102 executes computer readable program code. While only a single host system 102 is shown in FIG. 1, it will be understood that multiple host systems can be implemented, each in communication with p one another via direct coupling or via one or more networks. For example, multiple host systems 102 may be interconnected through a distributed network architecture. The single host system 102 may also represent a server in a client-server architecture.

In exemplary embodiments, the host system 102 includes at least one processing circuit (e.g., CPU 108) and volatile memory (e.g., RAM 110). The CPU 108 may be any processing circuit technology known in the art, including for example, a microprocessor, a microcontroller, an application specific integrated circuit (ASIC), a programmable logic device (PLD), a digital signal processor (DSP), or a multi-core/chip module (MCM). The RAM 110 represents any volatile memory or register technology that does not retain its contents through a power/depower cycle, which can be used for holding dynamically loaded application programs and data structures. The RAM 110 may comprise multiple memory banks partitioned for different purposes, such as data cache, program instruction cache, and temporary storage for various data structures and executable instructions. It will be understood that the host system 102 also includes other computer system resources known in the art, and not depicted, such as one or more power supplies, clocks, interfacing circuitry, communication links, and peripheral components or subsystems.

The user interface 104 includes a combination of input and output devices for interfacing with the host system 102. For example, user interface 104 inputs can include a keyboard, a keypad, a touch sensitive screen for inputting alphanumerical information, or any other device capable of producing input to the host system 102. Similarly, the user interface 104 outputs can include a monitor, a terminal, a liquid crystal display (LCD), or any other device capable of displaying output from the host system 102.

The data storage device 106 refers to any type of storage and may comprise a secondary storage element, e.g., hard disk drive, tape, or a storage subsystem that is internal or external to the host system 102. In alternate exemplary embodiments, the data storage device 106 includes one or more solid-state devices, such as ROM, PROM, EPROM, EEPROM, flash memory, NOVRAM or any other electric, magnetic, optical or combination memory device capable of storing data (i.e., a storage medium), some of which represent executable instructions for the CPU 108. It will be understood that the data storage device 106 shown in FIG. 1 is provided for purposes of simplification and ease of explanation and is not to be construed as limiting in scope. To the contrary, there may be multiple data storage devices 106 utilized by the host system 102.

In exemplary embodiments, the host system 102 executes a compiler 112. The compiler 112 may be a just-in-time (JIT) compiler, such as a Java® virtual machine (JVM), capable of converting bytecode input into executable code during program execution. In alternate exemplary embodiments, the compiler 112 is a static compiler converting high-level source code into low-level assembly or machine language. For example, the compiler 112 could support C# or other programming languages known in the art. In exemplary embodiments, the compiler 112 includes locking logic 114 that supports various identification, reservation, and cancellation algorithms for executing synchronized code (e.g., multiple threads accessing a shared object). The locking logic 114 may include a candidate identifier 116 that enables selective lock reservation based on class properties of code being compiled.

Since lock reservation cancellation is generally a very expensive operation in terms of execution time, the locking logic 114 can selectively apply reservation in very specific situations where it will be beneficial. Lock reservation typically improves monitor-enter and monitor-exit while performing a "fast-path" when the targeted object is unlocked. The fast-path for normal locking is a target object that is unlocked. The fast-path for lock reservation is a target object that is reserved by the thread trying to acquire the lock. However, the benefit from the improved reservation may be most substantial if the code guarded by monitor primitives is short running. In such a case, the overhead of memory coherency instructions dominates the performance of the code. When the guarded code is long running, then the overhead of the monitor primitives is likely negligible. To avoid excessive cancellation, selective use of reservation can be applied, only where it matters, for short-running synchronized code.

Code analyzed by the compiler 112 may be stored on the data storage device 106 organized as classes 118, with each class 118 containing one or more methods 120. The compiler 112 may use the candidate identifier 116 to determine if a given class 118 is dominated by short-running synchronized regions of code, and thus is a candidate for reservation. Otherwise, reservation of that class 118 may not be attempted. The classes 118 are analyzed the first time a method 116 of particular class 118 is compiled, or when a synchronized method 116 of the class 118 is incorporated inline for the first time.

The compiler 112 generates code that can reserve an object 122 for classes 118 that are marked as candidates for reservation. A class 118 that is marked as candidate can become unmarked if, at run-time, contention detector 124 determines that the reservation is increasing lock contention. To avoid excessive cancellation of reservations, further limiting may apply reservations on a monitor primitive basis. Namely, even for a class 118 that is marked as candidate for reservation, given the high overhead of cancellation, it may be preferable to avoid generating code that can reserve an object 122 if the code is rarely executed. The performance gain of the reservation may only be visible on "hot" code, i.e., code that is frequently executed. The compiler 112 can use the contention detector 124 to sample code execution and identify the "hot" code of an application, and generate monitor primitive code that reserves the object 122 for that piece of code.

Two types of monitor primitives may be generated for a class 118 that is marked as reservation candidate: true reserving monitor operations and monitor operations that maintain reservation. The true reserving monitor operations can be generated in hot code for a class 118 that is marked as a reservation candidate. In exemplary embodiments, the true reserving locks are the only lock operations that can reserve an object 122. In "cold" code for a class 118 marked for reservation, Tasuki-locks are generated (using techniques known in the art) with a modification so that they can maintain reservation if an object 122 is already reserved for the associated thread. A Tasuki lock is a locking method that supports deflation of a lockword to exploit a common observation that most contentions for an object are temporary. A hot piece of code may reserve an object 122 and occasionally call cold code that uses the object 122 as well. In such event, the cold code should not remove the reservation on the object 122 but maintain it. Conversely, if while executing "cold" monitor code of a class 118 that is marked for reservation, an access to an object 122 occurs that is not reserved, no attempt to reserve the object 122 is made. The lock in this case may behave as a regular Tasuki lock. The distinction as what kind of reservation code the compiler 112 generates for "hot" and "cold" is important for undoing reservation of a class 118. Namely, the "hot" portion of application code is usually represented by small number of methods 120. If reservation is undone for a class 118, recompilation may be performed for the part of the code that has incorrectly assumed that the class 118 is a good candidate for reservation. If the amount of the code that is recompiled by the compiler 112 is small, then the cost of undoing reservation of a class 118 will be negligible.

In exemplary embodiments, the candidate identifier 116 that determines if a class 118 is good candidate for reservation is static and optimistic. The determination is based on static analysis of the code, without accounting for any runtime behavior. Namely, a class 118 that contains a large amount of short running synchronized code can have contention issues. If such code is contended, then reservation can be detrimental to performance, because reservation may artificially increase the contention of the class 118 by reserving objects 122 for a thread instead of performing unlocking.

To support undoing reservation of a class 118, the contention detector 124 provides a runtime mechanism to detect class contention. Namely, if an object 122 of a class 118 is contended and the object 122 is reserved at the same time, the contention resolution code in the compiler 112 modifies the reservation status of the class 118 to false. While generating true reserving locks, the compiler 112 creates an assumption list 126 for each class 118, containing the methods 120 where the compiler 112 generates a true reserving lock for that class 118. When the compiler 112 modifies the reservation property of a class 118, it also requests that the compiler 112 undo reservation for the generated code. The compiler 112 may step through the assumption list 126 and create recompilation requests for methods 120 where true reserving locks are generated for an unreserved class 118. Since only "hot" code contains true reserving locks, the number of methods 120 that need to be recompiled will likely be small, and the overall cost of the recompilation in the long run will likely be negligible.

Undoing a reservation for generated code can also be implemented through code patching instead of recompilation. Code patching is may be faster than recompilation; however, since reservation is done in "hot" code, patching can produce suboptimal code as compared to recompilation. Suboptimal "hot" code can cause a performance degradation as compared to similar code that never applied reservation.

In exemplary embodiments, a fast-path for reserved monitor-enter and monitor-exit operations for "primitive" synchronized regions is improved over prior art algorithms. One aspect of lock reservation in prior art algorithms was to modify the meaning of a recursion count field of a monitor lock word for Tasuki-locks. The recursion count field is used to track the number of times that a monitor has been entered and not exited, signifying that a count of non-zero would mean that a reservation thread owns the lock at some point in time. If the recursion count is zero for a reserved object 122, it means that the object 122 is reserved but not owned. This distinction may be useful when another thread wants the reserved object 122 so it can perform reservation cancellation. The pseudo-code below shows the fast-path for reserving monitor-enter and monitor-exit operations for a prior art algorithm as presented in K. Kawachiya, A. Koseki, and T. Onodera; *Lock Reservation: Java Locks Can Mostly Do Without Atomic Operations*; Proceedings of ACM OOPSLA 2002, 131-141, 2002.

```
Monitor-enter
    if (object.reserved = TRUE and object.reservationThread =
    current thread)
        object.reservationCount = object.reservationcount + 1;
        enter synchronized region of code;
    else
        call regular monitor enter sequence;
    endif
Monitor-exit
    if (object.reserved = TRUE and object.reservationThread =
    current thread)
        object.reservationCount = object.reservationcount - 1;
        exit synchronized region of code;
    else
        call regular monitor exit sequence;
    endif
```

An improvement over the prior art can be achieved by the compiler 112 using cooperative multithreading when the synchronized region of code guarded by the monitor operations doesn't contain any async points. In exemplary embodiments, the fast-path is optimized through avoiding the increment and decrement operations, as illustrated in the following modified monitor sequences.

```
Monitor-enter
    if (object.reserved = TRUE and object.reservationThread =
    current thread)
        enter synchronized region of code;
    else
        call regular monitor enter sequence;
    endif
Monitor-exit
    if (object.reserved = TRUE and object.reservationThread =
    current thread)
        exit synchronized region of code;
    else
        call regular monitor exit sequence;
    endif
```

Furthermore, for "primitive" synchronized regions of code, the compiler 112 can version the code, in such a way that monitor-enter and monitor-exit primitives are replaced with a check if the lock is reserved for the current thread. In other words, without async points in the synchronized region of code, the state of the lock cannot change if the lock is reserved for the current thread. Therefore, if the lock is reserved for the current thread monitor-exit and the monitor-enter primitives are not utilized. The compiler 112 can check if the lock is reserved by the current thread, and if the test fails, then the code can branch to a regular reserved monitor-enter code, followed by a duplicated version of the guarded code and ending in reserved monitor-exit. The output code generated by the compiler 118 can be written back to the data storage device or may be executed, either creating new objects 122 or modifying existing objects 122. Exemplary versioned monitor sequences are as follows:

```
Original state of the code
    Monitor-enter (primitive reserving lock)
    <block of code guarded by synchronization>
    Monitor-exit (primitive reserving lock)
Modified code
    if (object.reserved = TRUE and object.reservationThread =
    current thread)
        <block of code guarded by synchronization>
    else
        Monitor-enter (primitive reserving lock)
        <block of code guarded by synchronization>
        Monitor-exit (primitive reserving lock)
    endif
```

While lock words such as that used in the object 122 can include any number of fields with differing numbers of bits, an exemplary lock word format is illustrated in table 1, where: ThreadID=A placeholder for a thread ID of a thread which is the current owner of the lock; Recursive count=A placeholder for counting how many times a lock has be entered recursively by the same thread; RES=Reserved lock; FLC=Flat Lock Contended; INF—Inflated lock. The meaning of the FLC and INF bits are known in the art, as explained in prior art references.

TABLE 1

| Object lock word structure in the object header for an object 122 | | | | |
|---|---|---|---|---|
| 24 bits | 5 bits | 1 bit | 1 bit | 1 bit |
| Thread ID | Recursive Count | RES | FLC | INF |

Exemplary semantics of a reserving lock, also referred to as a type-A lock, are further provided herein. An inlined path is a sequence of code executed in the same order as the code is written, and an outlined path is a sequence of code capable of execution out of the original sequence in which it is written. For an inline path, exemplary monitor-enter and exit logic is as follows. MONENTER: Check if the object lock word is equal to ThreadID+RES bit and if so, increment the recursive count by 1 and enter the monitor. MONEXIT: Check if the object lock word is equal to ThreadID+RES bit+INC value and if so, decrement the recursive count and exit the monitor. Otherwise, call the outlined path in both cases.

For an outlined path, exemplary monitor-enter and exit logic is as follows. MONENTER: Check if the recursive count for the monitor has reached a maximum value. If yes, call a helper routine 128 for "monitorEnter". If not, check if the object lock word is equal to ThreadID+RES, while masking out the recursive count. If there is a match, then increment the recursive count and return to enter the locked region. If there is a mismatch, attempt a flat lock enter of the monitor with ThreadID+RES+INC value. Flat lock enter and exit are the locking techniques are known in the art, for example, as described in D. F. Bacon, R. Konuru, C. Murthy, and M. Serrano; *Thin Locks: Featherweight Synchronization for Java*; Proceedings of ACM PLDI '98, 258-268, 1998. If the flat lock enter succeeds, the monitor will be reserved and the count incremented. If the flat lock enter fails, call a helper routine 128 for "monitorEnter". MONEXIT: Check if RES bit is set. If not, call a helper routine 128 for "monitorExit". Check if FLC or INF bits are set, and if yes call a helper routine 128 for "monitorExit". Check if the recursive count has reached 0, and if yes call a helper routine 128 for "monitorExit". Otherwise, decrement the recursive count and return to main line code.

Exemplary semantics of a primitive reserving lock, also referred to as a type-B lock, are further provided herein. For an inlined path, exemplary monitor-enter and exit logic is as follows. MONENTER: Check if the object lock word is equal to ThreadID+RES bit and if so, enter the monitor. MONEXIT: Check if the object lock word has RES bit set and no FLC or INF bits set. If the condition is met, exit the monitor. Otherwise, call the outlined path in both cases For an outlined path, exemplary monitor-enter and exit logic is as follows. MONENTER: Check if the recursive count for the monitor has reached a maximum value. If yes call a helper routine 128 for "monitorEnter". If not, check if the object lock word is equal to ThreadID+RES, while masking out the recursive count. If there is a match, then enter the locked region. If there is a mismatch, attempt a flat lock enter of the monitor with ThreadID+RES. Thus, if the flat lock enter succeeds, the monitor will be reserved and entered. If the flat lock enter fails, call a helper routine 128 for "monitorEnter". MONEXIT: Check if the RES bit is set. If not, call a helper routine 128 for "monitorExit". If the RES bit is set and the compiler 112 logic reaches this point, then the monitor will likely be contended so, increment the recursive count and a helper routine 128 for "monitorExit". In exemplary embodiments, the helper routines 124 expect that if a reserved monitor is currently held, then the recursive count is non-zero.

Exemplary semantics of a regular lock that preserves reservation, also referred to as a type-C lock, are further provided herein. For an inlined path, exemplary monitor-enter and exit logic is as follows. MONENTER: Check if the object lock word is non-zero, and if so call the outlined monitor enter path. Else, use a standard flat lock enter sequence. MONEXIT: Use a standard flat lock monitor exit.

For an outlined path, exemplary monitor-enter and exit logic is as follows. MONENTER: Check if the monitor is reserved and reserved by the same thread. If no, then call a helper routine 128 for "monitorEnter". If yes, check if there is enough count space in the recursive count. If the recursive count is not incremented, enter the monitor. If an overflow of the recursive count will occur, call a helper routine 128 for "monitorEnter". MONEXIT: Check if the monitor is reserved by the same thread, and if the recursive count is not zero. If yes, decrement the recursive count and return to main line code. Else, call a helper routine 128 for "monitorExit".

In exemplary embodiments, the helper routines 124 for monitorEnter and monitorExit perform various operations to support the proper functionality of the locking mechanisms. The helper routines 124 purpose is to "inflate" and "deflate" the monitors and handle contention as described in the prior art. For the purpose of the lock reservation, the semantics of the "monitorEnter" helper routine 128 may be modified to cancel the reservation on a reserved object. If a thread requests to lock an object 122 which is reserved by another thread, the reservation must first be cancelled.

For the purpose of canceling reservation, the "monitorEnter" helper routine 128 may perform the following.

Read the thread ID of the thread that has the object reserved

If the thread is "dead" at this point in time, then the helper routine "flat" locks the object 122 and returns.

If the current reserving thread is active, then the routine stops the reserving thread and inspects the object monitor state.

If the object 122 is reserved after the thread is stopped the following takes place:

The routine increments the cancellation count on the class 118.

If the lock is owned when stopped then the FLC bit is set and the thread starts waiting on the lock.

If the lock is not owned after the reserving thread is stopped, then the thread locks the object 122 with a "flat" lock.

If the object 122 is not reserved after the stop, a "flat" lock is obtained by the other thread and the execution continues.

Additional optimizations beyond those previously described can also be achieved in the compiler 112. It is possible to apply single reader lock optimizations to read-only reserved locks, and thus further reduce the locking overhead. As previously described, lock reservation can be implemented in the compiler 112 using locking logic 114 with the locking type schemes A-C, where type-A is non-primitive form lock reservation: the critical region contains async points, thus needs to be prepared so reservation can be cancelled (turning into a normal lock); type-B is primitive form lock reservation: the critical region doesn't contain async points (i.e., reservation cannot be cancelled); and type-C is normal lock with reservation preserving: normal lock with notion of reservation which does not overwrite reservation status if it is currently reserved by the thread.

For a particular lock acquire (monitor enter) and lock release (monitor exit) pair, the lock reservation code in the locking logic 114 decides if types A-C should apply based on the characteristics of the lock-owning class 118 and the compiled methods 120. While a larger performance advantage may be gained from types-A and B, type-C is important for types-A and B to work smoothly; otherwise, a monitor can toggle between reserved and non-reserved state at runtime, leading to worse performance. In exemplary embodiments, read-only locks are of type-B, a primitive form. This is because the lock protects only reads of shared memory, thus the critical region does not contain async points.

Exemplary annotated PowerPC™ instruction sequences for lock reservation monitor enter, exit and out-of-line code for type-B are provided in tables 2 (before) and 3 (after), illustrating advantages achieved using simple read monitor optimizations in the locking logic 114 of the compiler 112. These sample cases are for a read-only monitor, reading a single data item. For purposes of example, it is assumed that the address of the object 122 to be locked is in register "objReg" and the thread ID is in register "metaReg". Scratch registers "monitorReg", "valReg" and "tempReg" are employed for temporary usage. Also for purposes of example, "RES_BIT_MASK", "lockWordOffset", "RECURSION_BITS_MASK", "RES_FLC_INF_BITS_MASK", and "RECURSION_FLC_BITS_MASK" are all constants as follows: RES_BIT_MASK—mask with just the reserved lock (RES) bit set; lockWordOffset—the offset within an object 122 where the lock word is located; RECURSION_BITS_MASK—mask consisting of the recursive count bits. RES_FLC_INF_BITS_MASK—mask consisting of the reserved lock (RES) bit, the flat lock contended (FLC) bit, and the inflated (INF) bit; and RECURSION_FLC_BITS_MASK—mask consisting of the recursive count bits and flat lock contended (FLC) bit.

TABLE 2

Exemplary original code sequence for a type-B primitive form

| Assembler code | Comments |
|---|---|
| | Monitor enter sequence |
| lwz monitorReg, lockWordOffset(objReg) | Load the lock word |
| ori valReg, metaReg, RES_BIT_MASK | Compute the lock word value for a flat lock reserved by this thread |
| cmpl monitorReg, valReg | Test for a flat lock reserved by this thread |
| bne outofline_acquire | Out-of-line acquire code handles other cases |
| outofline_aquire_return: | Return here from the out-of-line acquire code |
| lwz r31,104(r8) | Lock protects just this shared data load |
| | Monitor exit sequence |
| lwz monitorReg, lockWordOffset(objReg) | Load the lock word |
| andi_r tempReg, monitorReg, RES_FLC_INF_BITS_MASK | Get only the RES, FLC and INF bits from the lock word |
| cmpli tempReg, RES_BIT_MASK | Test that only the RES bit is set |
| bne outofline_release | Out-of-line release code handles other cases |
| outofline_release_return: outofline_acquire: cmpli monitorReg, 0 | |
| bne reserved_checkLabel | Test for a free lock |
| li tempReg, lockWordOffset | Branch if not free |
| | Free lock: normal monitor enter sequence |
| loop: lwarx monitorReg, [objReg, tempReg] cmpli monitorReg, 0 bne enterCallLabel stwcx. valReg, [objReg, tempReg] bne loop | Acquire and reserve the lock for this thread |
| Isync | Prevent out-of-order execution of following code |
| b outofline_aquire_return reserved_checkLabel: | Check for a special case where this thread has the reserved lock |
| li tempReg, RECURSION_BITS_MASK andc tempReg, monitorReg, tempReg | Mask off the recursive count bits |
| cmpl tempReg, valReg | Test if recursively reserved by this thread |
| beq outofline_aquire_return enterCallLabel: | |
| bl monitorEntryHelper | Worst case: call the helper to acquire the lock |
| b outofline_aquire_return outofline_release: | At this point, know that the RES bit is not set, or the FLC or INF bit is set |
| li tempReg, RECURSION_FLC_BITS_MASK andc tempReg, monitorReg, tempReg | Mask out the recursive count and FLC bits from the lock word |
| addi valReg, metaReg, RES_BIT_MASK | Compute the lock word value for a flat lock reserved by this thread |
| cmpl tempReg, valReg | |
| bne exitCallLabel | If those are not equal, call the helper at this point, know that this thread has the reserved lock, but the FLC and possibly recursion bits are set |
| andi. tempReg, monitorReg, RECURSION_BITS_MASK | Isolate just the recursive count of the lock word |
| bne outofline_release_return | Recursively reserved by this thread: no other action required now |
| addi monitorReg, monitorReg, INC st monitorReg, lockWord_offset(objReg) exitCallLabel: | must increment the recursive count before calling the helper |

TABLE 2-continued

Exemplary original code sequence for a type-B primitive form

| Assembler code | Comments |
|---|---|
| bl monitorExitHelper | worst case: call the helper to release the lock |
| b outofline_release_return | |

TABLE 3

Exemplary code sequence optimized for simple read monitors for a type-B primitive form

| Assembler code | Comments |
|---|---|
| | Simple read monitor sequence |
| lwz monitorReg, lockWordOffset(objReg) | Load the lock word |
| ori valReg, metaReg, RES_BIT_MASK | Compute the lock word value for a lock reserved by this thread |
| cmpl monitorReg, valReg | Test for a lock reserved by this thread |
| bne outofline_read_monitor | Out-of-line code handles other cases |
| outofline_fast_read_return: | Return here from fast paths of the out-of-line code |
| lwz r31,104(r8) | Lock protects just this shared data load |
| outofline_slow_read_return: | Return here from slow path of the out-of-line code |
| outofline_read_monitor: cmpli monitorReg, 0 | |
| bne reserved_checkLabel | Test for a free lock |
| li tempReg, lockWordOffset | Branch if not free |
| | free lock: normal simple read monitor enter sequence |
| loop: lwarx monitorReg, [objReg, tempReg] cmpli monitorReg, 0 bne enterCallLabel stwcx. valReg, [objReg, tempReg] bne loop | Acquire and reserve the lock for this thread |
| or r8, r8, monitorReg | r8 now has an artificial dependency on monitorReg; monitorReg equals 0 so r8 is unchanged |
| b outofline_fast_read_return | Return to in-line load instruction; use of r8 forces ordering of lwarx and load |
| reserved_checkLabel: | Check for a special case where this thread has the reserved lock |
| li tempReg, RECURSION_BITS_MASK andc tempReg, monitorReg, tempReg | Mask off the recursive count bits |
| cmpl tempReg, valReg | Test if recursively reserved by this thread |
| beq outofline_fast_read_return enterCallLabel: | |
| bl monitorEntryHelper | Worst case: call the helper to acquire the lock |
| lwz r31,104(r8) | Lock protects just this shared data load |
| bl monitorExitHelper | Call the helper to release the lock |
| b outofline_slow_read_return | |

The simple read monitor optimizations of the locking logic 114 shorten and speed up both the inline code (code executed in order) and the out-of-line code (code executed out of order) required, across numerous computer architectures. The simple read monitor optimizations may also eliminate expensive instructions (e.g., "isync" instruction for a PowerPC™ architecture), which are used to prevent out-of-order execution of the load with respect to initially acquiring the lock by replacing the isync with an 'OR' instruction which introduces an artificial dependency to control the execution order.

Figure 2:
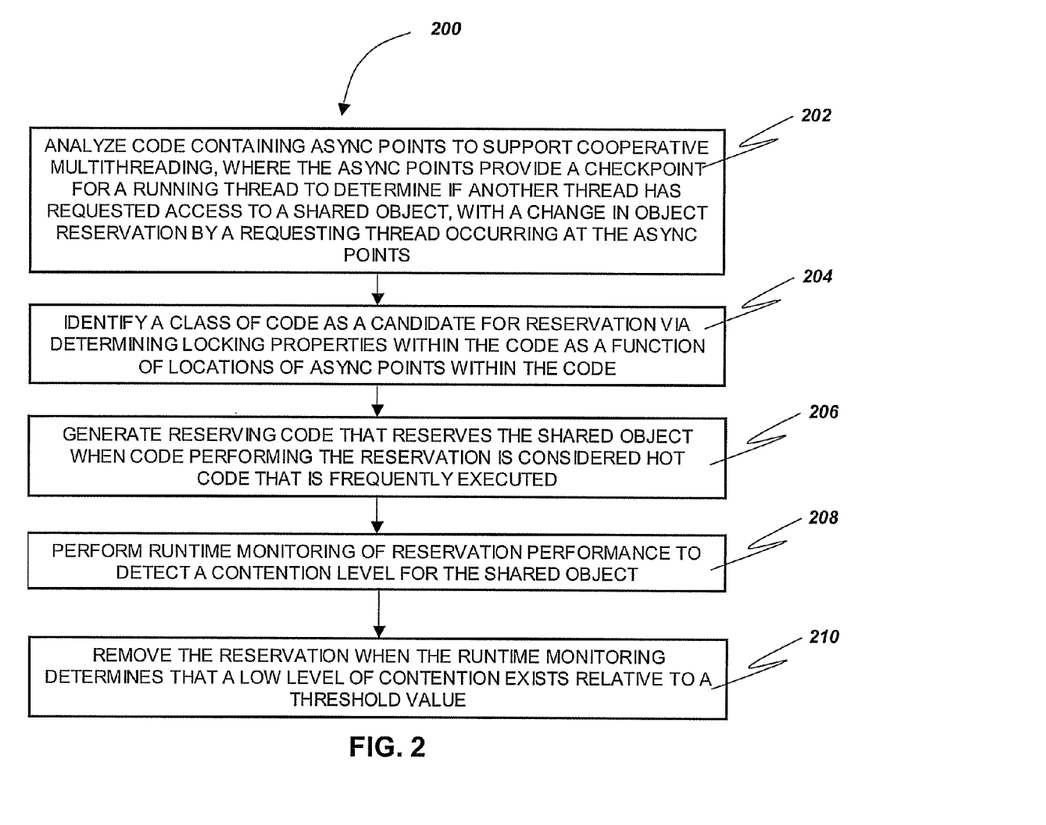
FIG. 2 depicts a process for effective lock reservation using cooperative multithreading.

Turning now to FIG. 2, a process 200 for effective lock reservation using cooperative multithreading will now be described in accordance with exemplary embodiments, and in reference to the system 100 of FIG. 1. A user can initiate the process 200 interactively through the host system 102 of FIG. 1, using the compiler 112 to compile code organized in classes 118 and methods 120. At block 202, the compiler 112 analyzes code containing async points to support cooperative multithreading, where the async points provide a checkpoint for a running thread to determine if another thread has requested access to a shared object 122, with a change in object reservation by a requesting thread occurring at the async points.

At block 204, the compiler 112 identifies a class 118 of code as a candidate for reservation via determining locking properties within the code as a function of locations of async points within the code. The compiler 112 may determine whether the class 118 of code is dominated by short-running synchronized regions of code and mark the class 118 for reservation.

At block 206, the compiler 112 generates reserving code that reserves the shared object 122 when code performing the reservation is considered hot code that is frequently executed. The reserving code may be generated for classes 118 marked for reservation as a true reserving monitor primitive operation or a monitoring operation that maintains reservation, where the true reserving monitor can perform lock operations to reserve the shared object 122. In exemplary embodiments, generation of reserving code that reserves the shared object 122 is tailored to a lock type and as a function of an inlined path and an outlined path based on the order of code execution, where the lock type is one of a reserving lock, a primitive reserving lock, and a regular lock that preserves reservation. Helper routines can be employed to support functionality of locking mechanisms including cancellation of the reservation. The code marked for reservation that is not considered hot code (e.g., cold code) may employ Tasuki-locks modified to maintain reservation of a reserved object.

At block 208, the compiler 112 performs runtime monitoring of reservation performance using the contention detector 124, detecting a contention level for the shared object 122. At block 210, the compiler 112 removes the reservation when the runtime monitoring determines that a low level of contention exists relative to a threshold value.

Figure 3:
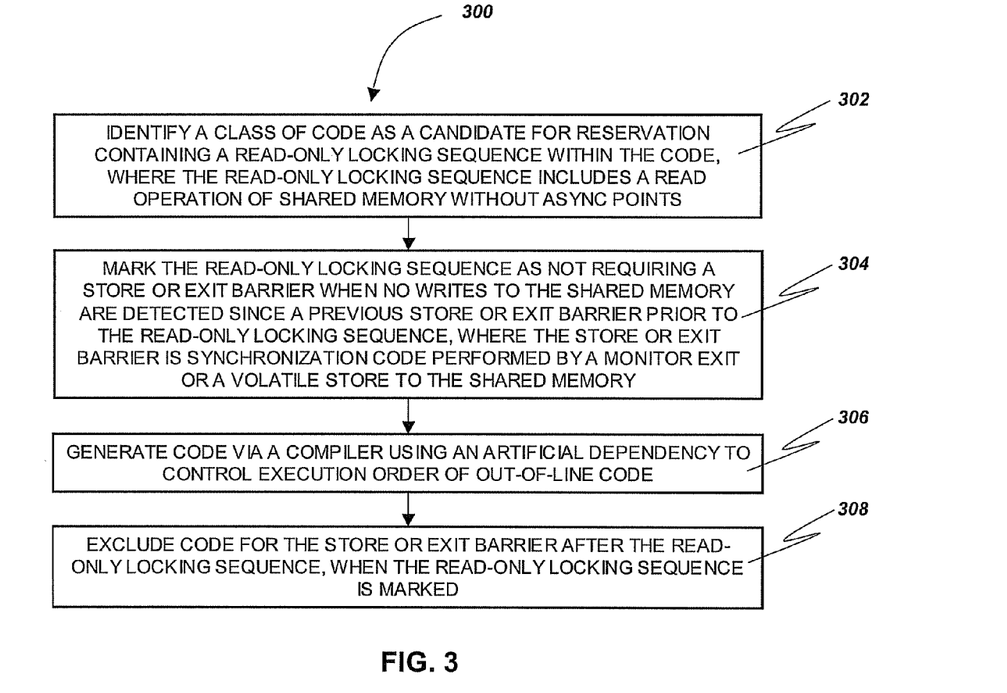
FIG. 3 depicts a process for lightweight single reader reserved locks in exemplary embodiments.

Turning now to FIG. 3, a process 300 for lightweight single reader reserved locks will now be described in accordance with exemplary embodiments, and in reference to the system 100 of FIG. 1. A user can initiate the process 300 interactively through the host system 102 of FIG. 1, using the compiler 112 to compile code organized in classes 118 and methods 120. The process 300 may also be incorporated as part of the process 200. At block 302, the compiler 112 identifies a class 118 of code as a candidate for reservation containing a read-only locking sequence within the code, where the read-only locking sequence includes a read operation of shared memory without async points, such as within an object 122 in the RAM 110. Identification of the read-only sequence can be performed using any technique known in the art, such as that disclosed in U.S. patent application Ser. No. 11/042,778 entitled COMPUTER-IMPLEMENTED METHOD, SYSTEM AND PROGRAM PRODUCT FOR ESTABLISHING MULTIPLE READ-ONLY LOCKS ON A SHARED DATA OBJECT, filed on Jan. 25, 2005, which is hereby incorporated by reference in its entirety. In exemplary embodiments, the compiler 112 employs logic such as the candidate identifier 116 to identify a candidate for reservation.

At block 304, the compiler 112 marks the read-only locking sequence as not requiring a store or exit barrier when no writes to the shared memory are detected since a previous store or exit barrier prior to the read-only locking sequence. The store or exit barrier (also referred to as a StoreExit barrier) is synchronization code performed by a monitor exit or a volatile store to the shared memory, such as an "lwsync" instruction on the PowerPC™ architecture. Further details of regarding removal of StoreExit barriers are disclosed in Canadian Patent Application 2539908 entitled LIGHTWEIGHT SINGLE READER LOCKS, filed on Mar. 16, 2006, which is hereby incorporated by reference in its entirety. In exemplary embodiments, the read-only locking sequence uses primitive reserving locks, also referred to as type-B locks above.

At block 306, the compiler 112 generates code via the compiler 112 using an OR instruction to control execution order of out-of-line code. This avoids the use of more time consuming instructions, such as "isync" on the PowerPC™ architecture. At block 308, the compiler 112 excludes code for the store or exit barrier after the read-only locking sequence, when the read-only locking sequence is marked. Remaining code generation via the compiler 112 can employ the techniques as previously described. Resulting code may be written to the data storage device 106 or to the RAM 110.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method executed by a processor for lock reservation using cooperative multithreading in a computer system, comprising:
   analyzing code containing async points to support cooperative multithreading, wherein the async points provide a checkpoint for a running thread to determine if another thread has requested access to a shared object, with a change in object reservation by a requesting thread occurring at the async points;
   identifying a class of code as a candidate for reservation via determining locking properties within the code as a function of locations of async points within the code;
   generating reserving code that reserves the shared object when code performing the reservation is considered hot code that is frequently executed;

performing runtime monitoring of reservation performance to detect a contention level for the shared object; and removing the reservation when the runtime monitoring determines that a low level of contention exists relative to a threshold value.

2. The method of claim 1 wherein identifying the class of code as the candidate for reservation further comprises:

determining whether the class of code is dominated by short-running synchronized regions of code; and marking the class for reservation.

3. The method of claim 2 wherein the reserving code is generated for classes marked for reservation as one of a true reserving monitor primitive operation and a monitoring operation that maintains reservation, wherein the true reserving monitor can perform lock operations to reserve the shared object.

4. The method of claim 3 wherein the code marked for reservation that is not considered hot code employs Tasuki-locks modified to maintain reservation of a reserved object.

5. The method of claim 1 wherein generating reserving code that reserves the shared object is tailored to a lock type and as a function of an inlined path and an outlined path based on order of code execution, where the lock type is one of a reserving lock, a primitive reserving lock, and a regular lock that preserves reservation.

6. The method of claim 5 wherein helper routines are employed to support functionality of locking mechanisms including cancellation of the reservation.

7. A method executed by a processor for lightweight single reader reserved locks in a computer system, comprising:

identifying a class of code as a candidate for reservation containing a read-only locking sequence within the code, wherein the read-only locking sequence includes a read operation of shared memory without async points;

marking the read-only locking sequence as not requiring a store or exit barrier when no writes to the shared memory are detected since a previous store or exit barrier prior to the read-only locking sequence, wherein the store or exit barrier is synchronization code performed by a monitor exit or a volatile store to the shared memory;

generating code via a compiler using an artificial dependency to control execution order of out-of-line code; and excluding code for the store or exit barrier after the read-only locking sequence, when the read-only locking sequence is marked.

* * * * *